United States Patent [19]

Nuttall

[11] 4,021,380

[45] May 3, 1977

[54] EXPANDABLE RESIN COMPOSITION

[75] Inventor: Fleet E. Nuttall, Hermosa Beach, Calif.

[73] Assignee: Mattel, Inc., Hawthorne, Calif.

[22] Filed: Feb. 27, 1976

[21] Appl. No.: 661,882

[52] U.S. Cl. .................. 260/2.5 HA; 260/2.5 E; 260/45.75 W; 264/54

[51] Int. Cl.² ......................................... C08J 9/10

[58] Field of Search ... 260/2.5 HA, 2.5 E, 45.75 W; 264/54

[56] References Cited

UNITED STATES PATENTS 3,431,203  3/1969  Hartmann et al. ........... 260/2.5 HA
3,464,934  9/1969  Birkett et al. ................ 260/2.5 HA

*Primary Examiner*—Morton Foelak
*Attorney, Agent, or Firm*—Stephen L. King; Robert W. Mulcahy

[57] ABSTRACT

An expandable resin composition for puff molding shaped parts is disclosed. The composition includes a thermoplastic olefin resin such as ethylene-vinyl acetate (EVA), a solid thermally activatable blowing agent, a solid thermally activatable cross-linking agent and an inorganic metal salt such as zinc borate which provides a finished part with high temperature strength enabling removal of the shaped part from a hot mold without tearing the skin.

15 Claims, No Drawings

EXPANDABLE RESIN COMPOSITION

BACKGROUND OF THE INVENTION

1. Field of the Invention

The present invention relates to an expandable resin composition and, more particularly, to a thermoplastic olefin resin composition containing solid fillers suitable for use in puff molding of shaped parts.

2. Description of the Prior Art

Puff molding is a process that results in a molded plastic foam shape significantly larger than the confining mold in which it was formed. A thermoplastic resin is blended with certain blowing and cross-linking agents. As the temperature is increased the blowing agent decomposes to release gas while simultaneously the cross-linking agent forms bonds between the molecules of the thermoplastic resin. When these changes occur within a heated, confining mold, the result is a compacted, cross-linked plastic matrix having memory of the shape of the confining mold, and filled with microscopic bubbles of highly compressed gas. If the hot mold is suddenly opened, the shape instantly expands to many times is original volume, but because of the cross-linking that has occurred the expanded shape retains the details and general configuration of the mold.

Puff molding has usually been utilized to form industrial parts such as shoe soles, insulation, trim, edging and other articles where tolerances were wide, the surface appearance and feel was not important to its use and the ability to hold intricate contours was not of concern. Prior processes required long residence times from loading to removal of the part from the mold and usually required cooling of the mold surfaces to affect release of the part from the confining mold. When it was attempted to reduce processing time by removing the parts from a hot mold cavity the parts exhibited poor texture, the closed foam cells were perceptible and the part tended to rip and split due to poor hot strength properties.

SUMMARY OF THE INVENTION

An improved expandable resin composition has been developed which permits rapid processing and provides smooth skinned, uniform cell, flexible parts which retain fine detail and configuration of the mold surface. The composition of the invention exhibits excellent characteristics at high temperature permitting separation from hot mold surfaces without tearing or affecting the skin surface. The molded parts have high resiliency such that the article returns to condition after crushing and has a very smooth, soft feel on the surface. The expanded composition is safe and non-toxic, has excellent buoyancy and can be readily compounded in many colors making it very desirable for use in toys, dolls, sporting equipment and other similar products. The ingredients of the composition are economical and the expandable composition can be produced at higher production rates with less heat and pressure energy requirements than other processes rendering it suitable for commercial scale production in large volume.

The expandable composition of the invention includes a major amount of a thermoplastic polyolefin resin such as polyethylene or vinyl copolymers thereof such as ethylene-vinyl acetate polymers containing from 5% to 40% vinyl acetate preferably from 15% to 25% vinyl acetate and a minor amount of from 5 to 20 parts per hundred parts by weight of thermoplastic resin (phr) of finely divided solid additives including a thermally activatible blowing agent, a thermally activatible cross-linking agent and a hot strength stabilizer additive comprising a borate salt. The composition may also optionally contain other finely divided solid agents such as a lubricating agent and activator agents which lower the normal activation temperatures of the blowing agent and/or the cross-linking agent.

The composition is processed by intimately mixing the solid agents throughout the resin composition at a temperature below the thermal activation temperature of either of the agents to preclude premature reactivity. The mixed material is preferably pelletized to place it in a form ready for molding. Molding may be accomplished by a single step injection of the plastic heated mass into a mold or by a two-step method in which the plasticated compound is injected into a cold mold rather than a hot mold to form a miniature preform. Using this approach results in no chemical activity at all. It is the standard thermoplastic injection molding cycle, but as such it is quite a quick cycle. Injection and reaction in the hot mold may require one or two minute cycle to allow for chemical reaction, injection into a cold mold requires cycling of less than a half minute. The miniature part is now placed into a confining mold then heated to reaction temperature to activate the blowing agent and cross-linking agent. The blowing agent decomposes with the accompanying liberation of gas without causing expansion of the thermoplastic resin. Simultaneously the cross-linking agent decomposes to form free radicals which form cross-linking bonds between adjacent resin chains and converts the material to a partially thermoset condition. On release and opening of the mold the compressed gas nucleii within the part expand many times and the part expands from 1½ to 10 times its original volume while retaining the shaped memory of the product developed by cross-linking under the confining shape of the mold.

The part releases readily from the hot mold and it may be possible to run the second mold continuously at 350° to 400° F rather than to thermally cycle the mold as is currently practiced.

The invention will now become better understood by reference to the following detailed description.

DESCRIPTION OF THE PREFERRED EMBODIMENT

The thermoplastic polyolefins useful in the present invention are generally crystalline, polyethylene homopolymers made by high, medium or low pressure polymerization processes or ethylene copolymers with a vinyl comonomer such as vinyl acetate, acrylic acid, acrylic ester, preferably ethylene-vinyl acetate copolymers containing from 5 to 40% vinyl acetate preferably from 10 to 25% vinyl acetate. The latter copolymers have been found to provide softer products with softer skin and feel. Parts formed from ethylene polymers are found to be stiffer.

The thermally activatable cross-linking agent should have an activation temperature above 300° F. The cross-linking agent is present in the composition in an amount from 0.40 to 3.0 phr, preferably from 1 to 2 phr. The cross-linking agent is preferably an organic peroxide which decomposes at a temperature above 250° F to form free radicals capable of forming cross-linkages in the resin. The organic peroxide cross-linking agents are suitable dicumyl peroxide, 2,5-dimethyl- 2,5-di(tert-butyl peroxy) hexane, 2,5-dimethyl-2,5-di(-tert-butyl peroxy) hexyne, 1,3-bis (tert-butyl peroxy isopropyl) benzene, 1,1-bis (tert-butyl peroxy) 3,3,5-trimethyl cyclohexane, tert-butyl hydroperoxide, di-tert-butyl-peroxide and the like.

The solid thermally activatable blowing agent is present in the composition in an amount from 2.0 to 7.0 phr and preferably from 3 to 5 phr. The blowing agent is decomposable at a temperature above 250° F preferably above 300° F and may be selected from azo-dicarbonamide, di-nitroso-pentamethylene-tetramine, p,p'-oxy-bis-benzene-sulfonohydrazide, p-toluene-sulfonyl-semicarbazide and the like.

The thermal activation temperature of the blowing agent can be substantially reduced by inclusion of an activator, preferably a zinc salt suitable at least one salt selected from zinc oxide and zinc stearate. The zinc stearate is also believed to function as an internal-external lubricant for the composition to aid in dispersing the solid filler throughout the composition during the preliminary mixing step and to aid in injection of the composition into the mold and in parting therefrom. The ratio of zinc oxide to zinc stearate is usually at least 1 to 1 and is preferably from 2 to 1 to 4 to 1.

The high temperature stabilization additive is present in the composition in an amount from 0.5 to 5 phr preferably from 1 to 2 phr. The additive is a borate salt of a Group I or Group II metal. Zinc borate is found to provide superior parts as compared to sodium borate possibly due to the additional amount of zinc ion present which aids in activation of the blowing agent.

The composition may also include dyes, pigments, inert fillers such as glass fiber, carbon black, calcium carbonate, silica, silicate, titanium white. Softening agents, lubricants, anti-oxidants, flame-retardants and anti-static agents can be added as needed.

Examples of practice follow.

The following runs were conducted by combining the listed ingredients on a two-roll mill and loading the mixture into a two-piece mold for subsequent expansion and cross-linking. during the milling process the temperature of the mixture was kept below 240° F to preclude any premature reaction. After mixing the composition was placed into a two-piece mold held together with a force of about 2000 psi while the mold was heated to 325° F and allowed to remain there for 15 to 30 minutes. Upon releasing pressure and opening the mold, the subsequent expanded molded product was examined and evaluated. The azo compound in each case was azo-dicarbonamide and the peroxide dicumyl peroxide.

TABLE I

| Run No. | Resin 100 phr | Azo, phr | DCP, phr | Activator Zn Stearate, phr | ZnO, phr | High Temp. Additive Compound | phr | Remarks |
|---|---|---|---|---|---|---|---|---|
| 1 | EVA-18 | 5 | 1 | 5 | — | — | — | Density 5.1 pds/cu. ft. |
| 2 | EVA-18 | 5 | 1 | — | 5 | — | — | Better than No. 1 |
| 3 | EVA-18 | 5 | 1 | — | — | Borax | 5 | Blistered |
| 4 | EVA-18 | 4 | 1 | — | — | Borax | 1 | Some blisters |
| 5 | EVA-18 | 4 | 1 | 2.5 | 2.5 | Borax | 1 | Good part |
| 6 | EVA-18 | 3.5 | 1 | 2 | 3 | Borax | ½ | Very good, almost blister-free, less edge tearing |
| 7 | EVA-18 | 4 | 2 | — | 5 | — | — | Excessively cross-linked - too little expansion |
| 8 | EVA-18 | 3.5 | 1 | — | 4 | Zinc Borate | 1 | Very good part, no blisters, good color, very little edge tearing |
| 9 | EVA-18 | 3.5 | 1 | 1.5 | 2.5 | Borax | 1 | Almost as good as run 5 |
| 10 | EVA-18 | 3.5 | 1.1 | — | — | Zinc Borate | 5 | Good surface, interior ballooned |
| 11 | EVA-18 | 3.5 | 1.0 | 3.5 | — | Borax | 0.5 | Average part |
| 12 | EVA-18 | 3.5 | 1.0 | 1.0 | — | Zinc Borate | 3.0 | Very good, comparable to run 8 |
| 13 | EVA-18 | 3.5 | 1.0 | — | 2.0 | Zinc Borate | 1.5 | Excellent part, surface and detail, no blisters |
| 14 | EVA-18 | 3.5 | 1.1 | — | 2.0 | Zinc Borate | 1.5 | Somewhat more dense than run 13 |
| 15 | LDPE | 3.5 | 1.0 | — | 2.0 | Zinc Borate | 1.5 | Good part, much stiffer than run 13 |
| 16 | EVA-18 | 3.5 | 1.1 | 2.0 | 2.0 | Zinc Borate | 1.5 | Good surface |
| 17 | EVA-18 | 3.5 | 1.1 | 2.5 | 2.5 | Zinc Borate | 2.0 | Slightly larger cells than run 19 |
| 18 | EVA-18 EVA-12 | 3.5 | 1.2 | — | 2.0 | | | |
| 19 | EVA-12 | 3.5 | 1.2 | — | 2.0 | Zinc Borate | 1.5 | Firm foam with glossy surface |
| 20 | EVA-33 | 3.5 | 1.1 | — | 2.0 | Zinc Borate | 1.5 | Very soft, flexible, rubber-like foam |

EVA-12 Ethylene-vinyl acetate containing 12% vinyl acetate
EVA-18 Ethylene-vinyl acetate containing 18% vinyl acetate
EVA-33 Ethylene-vinyl acetate containing 33% vinyl acetate
DCP Dicumyl peroxide
LDPE Low density polyethylene As can be seen from Table I runs containing zinc stearate alone or zinc oxide alone or borax alone provide blistered unsatisfactory parts. However, as soon as borax or zinc borate are combined with either zinc stearate or zinc oxide activators the surface improves, blistering decreases as does edge tearing. Parts having the best surface detail and characteristics are provided by compositions containing a combination of zinc borate with zinc oxide and zinc stearate.

A subsequent series of runs were conducted by subjecting the intimately mixed composition to a thermoset injection molding technique. After the compositions were fully blended on a two-roll mill, the material was then cut into small pieces and fed into the hopper of a reciprocating screw injection molding machine. This screw in turn injected the warmed, plasticated compound into a hold mold kept at about 350° F. After allowing a few minutes for the reaction to proceed the mold was opened and the molded foam part was evaluated. The azo blowing agent in each case was azodicarbonamide and the peroxide in each run was dicumyl peroxide except for run 31 in which an addtional 0.8 phr of 1,1-bis(t-butyl peroxy)-3, 3,5-trimethylcyclohexane was added to 1.0 phr of dicumyl peroxide. The results follow.

TABLE II

| Run No. | Resin, 100 phr | Azo, phr | Peroxide, phr | Activator ZnO, phr | Activator Zn Stearate phr | High Temp Additive Zinc Borate phr | Remarks |
|---|---|---|---|---|---|---|---|
| 21 | EVA-18/EVA-12 | 3.5 | 1.2 | 2.0 | — | 1.5 | Very good part |
| 22 | EVA-12 | 3.0 | 1.2 | 2.0 | — | 1.5 | Rather stiff, less expansion |
| 23 | LDPE | 5.0 | 1.1 | 2.5 | — | 1.5 | Quite stiff, tears easily |
| 24 | EVA-18 | 3.5 | 1.0 | 2.0 | 0.5 | 1.5 | Excellent |
| 25 | '' | 3.5 | 2.0 | 2.0 | 0.5 | 1.5 | Very high density |
| 26 | '' | 3.5 | 1.3 | 2.0 | 0.5 | 1.5 | High density |
| 27 | '' | 3.5 | 0.75 | 2.0 | 0.5 | 1.5 | Insufficient cross-linking |
| 28 | '' | 4.0 | 1.2 | 2.0 | 0.5 | 1.5 | Good part |
| 29 | '' | 4.0 | 1.2 | 2.0 | 0.5 | — | Hot molded foam parts, tear more readily than Run 28 |
| 30 | '' | 3.5 | 1.1 | 2.0 | 1.0 | 2.0 | Best of above runs |
| 31* | '' | 3.5 | 1.0/0.8 | 2.0 | 0.5 | 2.0 | Not as good as Run 30 |
| 32 | '' | 3.8 | 1.1 | 2.0 | 1.0 | 2.0 | Excellent parts and surface, good cell size. |

*Also includes 1.0 phr of stearic acid.

As can be seen from Table II, the azo and peroxide compounds can be adjusted to provide different cell size and stiffness to the part or the amount of ethylene monomer can be increased to provide stiffness. Removal of borate decreases the hot strength of the molded part as shown in run 29 and the best properties are provided by a combination of zinc oxide, zinc stearate and zinc borate.

It is to be realized that only preferred embodiments of the invention has been disclosed and that numerous substitutions, alterations and modifications may be practiced without departing from the spirit and scope of the invention as defined by the following claims.

What is claimed is:

1. An expandable resin composition comprising a thermoplastic 1-olefin polymer containing an intimate dispersion of a solid thermally activated organic blowing agent, a solid thermally activatable organic cross-linking agent and a metal borate salt in an amount effective to reduce skin tearing on removal of an expanded part from a hot mold.

2. A composition according to claim 1 in which the 1-olefin polymer is selected from homopolymers of ethylene or copolymers containing from 5 to 40% vinyl comonomer.

3. A composition according to claim 2 in which the comonomer is vinyl acetate present in the copolymer in an amount from 15% to 25% by weight.

4. A composition according to claim 2 in which the blowing agent, cross-linking agent and borate salt are present in an amount between 5 to 20 phr.

5. A composition according to claim 4 in which said agents have a thermal activation temperature above 250° F.

6. A composition according to claim 5 in which the cross-linking agent is an organic peroxide present in the composition in an amount from 0.4 to 3.0 phr.

7. A composition according to claim 6 in which the peroxide is dicumyl peroxide present in the composition in an amount from 1 to 2 phr.

8. A composition according to claim 6 in which the organic blowing agent is an azo compound present in the composition in an amount from 2 to 7 phr.

9. A composition according to claim 8 in which the azo compound is azodicarbonamide present in the composition in an amount from 3 to 5 phr.

10. A composition according to claim 8 further including 1.0 to 7 phr of an activator for the blowing agent.

11. A composition according to claim 10 in which the activator is selected from zinc oxide, zinc stearate and mixtures thereof.

12. A composition according to claim 11 in which the ratio of zinc oxide to zinc stearate is at least 2/1.

13. A composition according to claim 5 in which the borate is a salt of a Group I or Group II metal.

14. A composition according to claim 13 in which the borate is present in an amount from 0.5 to 5 phr.

15. A composition according to claim 14 in which the borate is zinc borate.

* * * * *